United States Patent [19]

Dyroff et al.

[11] 4,302,564

[45] Nov. 24, 1981

[54] SELECTIVELY CONTROLLING THE HYDROLYTIC STABILITY OF ACETAL CARBOXYLATE POLYMERS

[75] Inventors: David R. Dyroff, Creve Coeur; Gary J. Lynch, St. Louis County; Victor D. Papanu, Maryland Heights, all of Mo.

[73] Assignee: Monsanto Company, St. Louis, Mo.

[21] Appl. No.: 156,706

[22] Filed: Jun. 5, 1980

[51] Int. Cl.$^3$ .......................... C08G 6/00; G08L 61/02
[52] U.S. Cl. ................................... 525/398; 525/400; 525/403; 528/232; 528/239; 528/243; 528/245; 528/270
[58] Field of Search ....................... 525/398, 400, 403; 528/232, 239, 243, 245, 270

[56] References Cited

U.S. PATENT DOCUMENTS 4,144,226  3/1979  Crutchfield et al. ............... 528/231
4,204,052  5/1980  Crutchfield et al. ............... 525/398

*Primary Examiner*—Lucille M. Phynes
*Attorney, Agent, or Firm*—S. M. Tarter; W. H. Duffey; R. C. Griesbauer

[57] ABSTRACT

The alkali metal, ammonium and alkanol amine salts of acetal carboxylate polymers are known to be stable detergent builders and chelating agents which depolymerize in acid media making the polymer fragments more readily biodegradable in waste streams. Now, according to the present invention, the hydrolytic stability of an acetal carboxylate polymer can be controlled by bringing together under polymerization conditions an ester of glyoxylic acid and a polymerization initiator and adding to the termini of the resulting polymer end groups having substituents which are selected to be more electron withdrawing as the desired hydrolytic stability increases.

11 Claims, No Drawings

SELECTIVELY CONTROLLING THE HYDROLYTIC STABILITY OF ACETAL CARBOXYLATE POLYMERS

BACKGROUND OF THE INVENTION

This invention relates to an improved method of preparing acetal carboxylate polymers which are useful as complexing agents and detergency builders.

The property possessed by some materials of improving detergency levels of soaps and synthetic detergents and the use of such materials in detergent compositions is known. Such cleaning boosters are called "builders" and such builders permit the attainment of better cleaning performance than is possible when so-called unbuilt compositions are used. The behavior and mechanisms by which builders perform their function are only partially understood. It is known that good builders must be able to sequester most of the calcium and/or magnesium ions in the wash water since these ions are detrimental to the detergency process. However, it is difficult to predict which class of compounds possess useful combinations of builder properties and which compounds do not because of the complex nature of detergency and the countless factors which contribute both to overall performance results and the requirements of environmental acceptability.

Acetal carboxylate polymers have been found to be suitable as a builder in detergent formulations. The composition of such acetal carboxylate polymers has been disclosed in U.S. Pat. No. 4,144,226 issued Mar. 13, 1979 and in Ser. No. 962,512 filed Nov. 20, 1978. The use of such acetal carboxylate polymers in detergent compositions is disclosed in U.S. Pat. No. 4,146,495 issued Mar. 27, 1979. A preferred method for the saponification of the esters of the acetal carboxylate polymers to form the corresponding alkali metal salt is disclosed in U.S. Pat. No. 4,140,676 issued Feb. 20, 1979. The acetal carboxylate polymeric salts described in the above applications and patents were tested for sequestration function using the procedures described by Matzner et al in "Organic Builder Salts as Replacements for Sodium Tripolyphosphate," TENSIDE, 10, No. 3, pages 119-125 (1973). As a result of such tests, the polymeric acetal carboxylate salts were found to be superior detergent builders compared to sodium tripolyphosphate and were stable under laundry use conditions but depolymerized at lower pH making the polymers more readily biodegradable.

The acetal carboxylate polymers prepared according to the methods disclosed in the above patents and patent applications provide satisfactory results. However, it was observed that some acetal carboxylate polymers had greater hydrolytic stability than others and it was further observed that the hydrolytic stability was related to the chemically stable group at the polymer termini which stabilized the polymer against rapid depolymerization in alkaline solution. Those skilled in the art would find it desirable to be able to predict the hydrolytic stability of a particular acetal carboxylate polymer, not only to determine whether or not a particular acetal carboxylate polymer would be suitable for use in a particular detergent formulation, but also to determine the usefulness of such acetal carboxylate polymers in applications outside of cleaning and detergency, for example, the deflocculation of kaolin clays.

Now, a relationship has been established between hydrolytic stability and the structure of the particular end groups at the termini of the acetal carboxylate polymer. This relationship permits those skilled in the art to be able to predict which acetal carboxylate polymer will be more hydrolytically stable compared to other acetal carboxylate polymers, permitting the usefulness of such acetal carboxylate polymers to be extended to numerous other applications, both within and outside of the detergency and cleaning field.

SUMMARY OF THE INVENTION

These and other advantages and unexpected results are achieved in a method of controlling the hydrolytic stability of an acetal carboxylate polymer having the general formula:

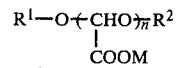

wherein n averages at least 4; M is selected from the group consisting of alkyl groups having 1 to about 4 carbon atoms, alkali metals, ammonium and alkanol amine groups having from 1 to about 4 carbon atoms; $R^1$ and $R^2$ are individually any chemically stable group which stabilizes the polymer against rapid depolymerization in alkaline solution; prepared by:

(a) bringing together under polymerization conditions an ester of glyoxylic acid and a polymerization initiator;

(b) adding to the termini of the resulting polymer a chemically stable end group to stabilize the polymer against rapid depolymerization in alkaline solution;

the improvement which comprises controlling the hydrolytic stability by the selection of end groups having substituents on the acetal carbon atom nearest the corresponding terminus of the stabilized polymer, the substituents being more electron withdrawing as hydrolytic stability increases.

For the purposes of this invention, the term "rapid depolymerization in alkaline solution" as it is used in the specification and claims shall mean that in an aqueous solution of 0.5 molar sodium hydroxide containing 10 grams per liter of the polymer product of the present invention, the average chain length of the polymeric acetal carboxylate will be reduced by more than 50 percent, as determined by Proton Magnetic Resonance after 1 hour at 20° C.

Broadly described, the acetal carboxylate polymer product of the present invention can be prepared by bringing together under polymerization conditions a glyoxylate ester and a polymerization initiator and adding to the termini of the resulting polymer a chemically stable group to stabilize the polymer against rapid depolymerization in alkaline solution. To prepare the polymer salt for use as a chelant, sequestrant and detergency builder and for other applications, the stabilized polymer can be saponified with an alkali metal hydroxide to form the corresponding alkali metal salt. The alkali metal salt can be converted to the ammonium or alkanol amine salt by conventional ion exchange techniques.

The procedure for bringing together in a reaction zone under polymerization conditions a glyoxylate ester and a polymerization initiator, and optionally one or more comonomers, has been described in detail in U.S. Pat. No. 4,144,226 issued Mar. 13, 1979. Broadly described, a glyoxylate ester is prepared by reacting an alcohol containing from 1 to 4 carbon atoms with a glyoxylic acid hemiacetal or hydrate under conditions known to those skilled in the art and converting the resulting ester hemiacetal to the corresponding glyoxylate ester by known techniques, such as the reaction of the ester hemiacetal with phosphorus pentoxide. Thereafter, the glyoxylate ester is polymerized using a suitable initiator such as boron trifluoride etherate, 3 A molecular sieves, or preferably dialkyl sodiomalonate or sodiomethyl malonate esters. The resulting polymer is reacted at its termini in the presence of a suitable catalyst with a reagent which produces a chemically stable end group to stabilize the resulting polymer against rapid depolymerization in alkaline solution. The polymer which is stabilized against rapid depolymerization in alkaline solution is useful as an intermediate to prepare the corresponding alkali metal, ammonium or alkanol amine salts. It is only necessary to saponify the stabilized polymeric ester with an alkali metal hydroxide, such as lithium hydroxide, sodium hydroxide, potassium hydroxide and the like, using conventional saponification techniques to make a salt suitable for use as a builder, sequestrant, dispersant and the like. The alkali metal salt can be converted to the ammonium or alkanol amine salts using conventional ion exchange techniques.

It is important in the process of the present invention to provide an acetal carboxylate polymer containing a sufficient number of acetal carboxylate segments to be effective in its intended application. It has been found that when n averages less than about 4, the polymer is not effective in most applications. On the other hand, when n is greater than about 200, a functional increase in performance usually is not achieved, although the use of polymers wherein n averages greater than 200 is not harmful in most applications. When the polymer is to be used as a chelant, dispersant or detergent builder, it is preferred that n averages between about 20 and about 200, and it is especially preferred that n averages between about 50 and about 100.

As is known to those skilled in the art, any number of chemically reactive groups can be added to the polymer termini to provide end groups, which can be alike or different in the polymer structure, to stabilize the polymer against rapid depolymerization in an alkaline solution. It is only necessary that the chemically reactive group stabilizes the acetal carboxylate polymer against rapid depolymerization in an alkaline solution, and the specific nature of the chemically reactive group is not important in the proper function of the polymer in its intended use. As an example, suitable chemically stable end groups include stable substituent moieties derived from otherwise stable compounds such as: alkanes, such as methane, ethane, propane, butane and higher alkanes such as decane, dodecane, octadecane and the like; alkenes such as ethylene, propylene, butylene, decene, dodecene and the like; branched chain hydrocarbons, both saturated and unsaturated, such as 2-methyl butane, 2-methyl butene, 4-butyl-2,3-dimethyl octane and the like; aromatic hydrocarbons such as benzene, toluene, xylene and the like; cycloalkanes and cycloalkenes such as cyclohexane and cyclohexene and the like; alcohols such as methanol, ethanol, 2-propanol, cyclohexanol, and the like; polyhydric alcohols such as 1,2-ethane diol, 1,4-benzene diol and the like; ethers such as methoxyethane methyl ether, ethyl ether, ethoxy propane and cyclic ethers such as ethylene oxide, epichlorohydrin, tetramethylene oxide and the like. The above listing is intended to be instructive and is not intended to be limiting since other chemically stable end groups that stabilize the polymer against rapid depolymerization in an alkaline solution will occur to those skilled in the art.

The selection of the end group is important in the method of the present invention since the end group structure has a major effect on the hydrolytic stability of the polymer. Substantial variations in hydrolytic stability of the polymer can be achieved by rather modest variations in the structure of the end group. The structure of any end group can be expressed in the following form:

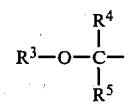

wherein $R^4$ and $R^5$ are the substituents on the acetal carbon atom nearest the corresponding terminus of the stabilized polymer and $R^3$ is a moiety representing the remainder of the end group. When $R^5$ is H, the relative stability of each end group in the polymer structure at a given pH can be predicted using the sigma value of the substituent $R^4$. The Hammet or Taft substituent constants (i.e., sigma values) of representative groups can be found in many physical chemistry textbooks. Among several different such acetal carboxylate polymers, the order of hydrolytic stability will tend to be such that the one with end groups in which the substituents $R^4$ have the most negative substituent constants (sigma values) will hydrolyze fastest, and the polymer with end groups in which the substituents $R^4$ have the most positive sigma value will hydrolyze slowest.

The relative hydrolytic stability can best be illustrated using three different polymers stabilized with different types of end group structures, wherein $R^5$ in all cases is H. When the polymer is stabilized by end groups derived from dialkyl sulfate, $R^3$ is alkyl, preferably 1 to about 4 carbon atoms, and $R^4$ is —COOM. When the polymer is stabilized using an end group derived from methyl or ethyl vinyl ether, $R^3$ is methyl or ethyl and $R^4$ is methyl. When the end group is derived from dimethoxymethane, $R^3$ is methyl and $R^4$ is hydrogen.

These acetal carboxylate polymer end groups are listed in Table 1 in order of decreasing hydrolytic stability. The Hammet-Sigma functions ($\sigma_p$) were obtained from J. March, "Advanced Organic Chemistry," McGraw-Hill Book Company, New York, N.Y. (1968), page 241.

TABLE 1
HYDROLYTIC STABILITY AS A FUNCTION OF SIGMA VALUE

| End Group | $R^4$ | $R^3$ | $R^4\sigma_p$ | Relative Hydrolysis Rate |
|---|---|---|---|---|
| $-\overset{H}{\underset{COONa}{C}}-O-CH_3$ | —COONa | —$CH_3$ | 0.13 | ~1 |
| $-\overset{H}{\underset{COONa}{C}}-O-CH_2-CH_2CH_3$ | —COONa | —$C_2H_5$ | 0.13 | ~1 |
| $-\overset{H}{\underset{COONa}{C}}-O(CH_2CH_2O)_{n-3}H$ | —COONa | $(CH_2CH_2O)_{n-3}H$ | 0.13 | ~1 |
| $-\overset{H}{\underset{H}{C}}-O-CH_3$ | —H | —$CH_3$ | 0 | ~3,000 |
| $-\overset{H}{\underset{H}{C}}-O-CH_2CH_3$ | —H | —$C_2H_5$ | 0 | ~3,000 |
| $-\overset{H}{\underset{CH_3}{C}}-O-CH_3$ | —$CH_3$ | —$CH_3$ | −0.13 | ~20,000 |
| $-\overset{H}{\underset{CH_3}{C}}-O-CH_2CH_3$ | —$CH_3$ | —$C_2H_5$ | −0.13 | ~20,000 |

While the end groups with the same $R^4\sigma_p$ values in Table 1 hydrolyze at approximately equal rates, the hydrolysis rate increases about 20,000 times as $R^4\sigma_p$ decreases from +0.13 to −0.13. Thus, it can be seen the variation in $R^4$ from —COONa to —$CH_3$ dramatically affects the hydrolysis rate. However, $R^3$ has much less effect than the effect from $R^4$.

It has been found that when $R^5$ is H and the Hammet-Sigma value of substituent $R^4$ is much less than about −0.15, the resulting polymer is too unstable for most uses in an aqueous environment. On the other hand, when $R^5$ is H and the Hammet-Sigma value of $R^4$ in each end group is about 0.13, the hydrolytic stability of the end group is comparable to that of the polymer backbone, and not much additional hydrolytic stability of the polymer is achieved by further increase in the Hammet-Sigma value of $R^4$. Thus, when $R^5$ is H, in most application for purposes of controlling hydrolytic stability, it is preferred to use polymers with end groups in which $R^4$ has a Hammet-Sigma value between about −0.15 and 0.15, for example between about −0.13 and 0.13.

When $R^5$ is not H, the relative hydrolytic stability of each end group, and hence of the polymer, can be similarly controlled by selecting substituents $R^4$ of varying Hammet-Sigma values such that the sigma value is greater (more positive) as the desired hydrolytic stability increases. However, in such cases, because the influence of $R^5$ is different, the preferred range for the sigma value of $R^4$ will usually be different than that specified above for the case where $R^5$ is H.

Optionally, the acetal carboxylate polymer can also contain other polymer fragments and accordingly the polymer can be a linear homopolymer or copolymer or it can be branched. To form a copolymer, the glyoxylate ester is polymerized with any number of comonomers known to those skilled in the art. It is only necessary that the comonomer does not cause the acetal carboxylate polymer to rapidly depolymerize in alkaline solution. Suitable comonomers include: epoxy compounds, such as ethylene oxide, propylene oxide, epihalohydrin, epoxy succinate and the like; aldehydes containing from 1 to about 20 carbon atoms, such as formaldehyde, acetaldehyde, steric aldehyde and the like. Of the numerous comonomers that can be polymerized with the glyoxylate ester, aldehydes are preferred and low molecular weight aldehydes having up to 4 carbon atoms such as formaldehyde are especially preferred.

Thus, one embodiment of this invention is provided in a method of controlling the hydrolytic stability of an acetal carboxylate polymer having the general formula:

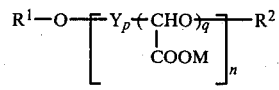

wherein Y is one or more moieties derived from a comonomer randomly distributed along the polymer chain and the moieties are derived from compounds selected from the group consisting of epoxy compounds and aldehydes having up to about 20 carbon atoms; p has an average value of 1; the product of q and n averages at least 4; M, $R^1$ and $R^2$ are as previously defined, prepared by:
(a) bringing together under polymerization conditions an ester of glyoxylic acid, one or more comonomers, and a polymerization initiator; and
(b) adding to the termini of the resulting polymer a chemically stable end group to stabilize the polymer against rapid depolymerization in alkaline solution;

the improvement which comprises controlling the hydrolytic stability by selection of end groups having substituents on the acetal carbon atom nearest the corresponding terminus of the stabilized polymer, the substituents being more electron withdrawing as hydrolytic stability increases.

As is the case with a homopolymer, it is important that a sufficient number of acetal carboxylate segments are present in the copolymer made by the process of the present invention to be effective in its intended application. When the product of n and q averages less than about 4, the copolymer is not effective in most applications. On the other hand, when the product of n and q averages greater than about 200, a functional increase in performance usually is not achieved, although the use of copolymers wherein the product of n and q averages greater than 200 is not harmful in most applications. When the copolymer is to be used as a chelant, dispersant or detergent builder, it is preferred that q averages at least 4 and the product of n and q averages between about 10 and about 200, and it is even more preferred that q averages at least 8 and the product of n and q averages between about 50 and about 100.

Hence, an acetal carboxylate polymer can be prepared with a wide range of hydrolytic stabilities to make the polymer useful for either relatively fast or slow hydrolysis at a given pH. Numerous other end groups derived from stable compounds can be added to the polymer termini to accomplish such variations in hydrolysis rates. Also, other factors in addition to the end group, such as pH, temperature, steric hindrances, incorporation of comonomers, and the like, can affect hydrolytic stability. However, the hydrolytic stability of any particular acetal carboxylate polymer under a given set of conditions can be controlled within certain limits by modification of the end group structure. The optimum end group structure to provide an acetal carboxylate polymer having the desired hydrolytic stability for a given application can be confirmed by routine experimentation.

In order to be useful for use as a chelant, detergent builder and the like, the acetal carboxylate polymer must be stabilized against rapid depolymerization in alkaline solution. For example, the polymer is not stable against depolymerization in alkaline solution when $R^4$ is —COOM and $R^3$ is hydrogen, and polymers that are not stable against rapid depolymerization in alkaline solution are outside the scope of the present invention.

DESCRIPTION OF THE PREFERRED EMBODIMENTS

This invention is illustrated by but not limited to the following Examples wherein all percentages are by weight unless otherwise stated.

EXAMPLE I

A. Preparation of Methyl Glyoxylate

A 2-liter, 4-necked, round bottom flask equipped with an overhead stirrer, thermometer and 30 centimeter Vigreaux column and take-off head is charged with 1200 grams (10 moles) of methyl glyoxylate methyl hemiacetal. A total of 568 grams of phosphorus pentoxide (4 moles) is added in 4-6 portions keeping the reaction temperature below 90° C. The addition requires about 90 minutes. When the addition is complete, the mixture is stirred until the temperature has fallen to about 70° C. (0.5 hour). The mixture is distilled at aspirator vacuum (20-40 torr) yielding 764 grams crude methyl glyoxylate having a boiling point of 56°-61° C. The distillation is stopped when the pot temperature reaches 125° C. since a violent decomposition may occur at higher temperatures. Chromatographic analysis of this crude material indicates 86.6 percent glyoxylate, 9.3 percent methyl dimethoxy acetate, 3.3 percent dimethyl oxalate, and trace amounts of unidentified products.

The crude product is then distilled from 25 grams of 3 A molecular sieves which had been heated to about 250° C. to drive off residual moisture and organics, through the Vigreaux column. A 15-gram forecut of about 97 percent pure glyoxylate is collected initially. The Vigreaux column is replaced by a 30 centimeter Widmer column and 521 grams of 99 percent pure polymerizable grade methyl glyoxylate is collected having a boiling point of 83°-84° C. at 210 torr. A final cut of 36 grams (93 percent pure) ester is collected in a final fraction (91°-94° C.; 210 torr). The overall yield of polymerizable glyoxylate is 59 percent from the hemiacetal.

B. Preparation of Polymer

To a 200 milliliter, 3-necked, round bottom flask equipped with an efficient stirrer and thermometer were added 36 grams of glyoxylate ester from Section A above (0.4 mole) and 9 milliliters of methylene chloride. The mixture was cooled to about 0° C. and then 300 microliters of 0.05 molar sodio dimethyl methyl malonate in tetrahydrofuran were added. The temperature rose to about 33° C. The mixture was cooled to 0° C. and stirred at that temperature for about 1 hour. Then 5-gram portions were taken and separately stabilized using a variety of chemically stable end groups. The reagent to provide the chemically stable end group and the identification of the end groups are shown in Table 2. In all cases, the temperature at the beginning of adding the reagent was maintained at 0° C. and the resulting polymer had a chain length of about 50 repeating units.

TABLE 2

| POLYMER STABILIZATION WITH VARIOUS REAGENTS | | | |
|---|---|---|---|
| REAGENT | | $R^1$ | $R^2$ |
| $CF_3COOH$ | Ethyl Vinyl Ether | H<br>$CH_3C-$<br>\|<br>$OCH_2CH_3$ | H<br>$-C-CH_3$<br>\|<br>$OCH_2CH_3$ |
| NaH | Dimethyl-sulfate | H<br>$H_3COC-$<br>\|<br>COONa | H<br>$-C-OCH_3$<br>\|<br>COONa |
| $P_2O_5$ | Dimethoxy-methane | $H_3C-O-CH_2-$ | $-CH_2-O-CH_3$ |

C. Saponification

Each of the polymers of Section B was poured into about 30 milliliters of 2 molar sodium hydroxide and stirred for about 5 minutes. This mixture was washed 3 times with saturated sodium bicarbonate solution. Then there were added with cooling and stirring about 13 milliliters of 10 normal NaOH solution. Each mixture was stirred for two hours and then about 20 milliliters of methanol were added. The solution was stirred for about 30 minutes and a precipitate was collected on a sintered glass funnel. Each precipitate was washed twice with methanol and twice with diethyl ether and dried for one hour on the sintered glass funnel using aspirator vacuum.

EXAMPLE II

Each of the acetal carboxylate polymers prepared in Example I was tested as a deflocculant for a viscous kaolin slurry by adding one-tenth gram of the acetal carboxylate polymer to 100 grams of the kaolin slurry.

In each case, the acetal carboxylate polymer deflocculated the kaolin as indicated by a dramatic change in viscosity from a thick gel having an initial pH of about 6 to that of a pumpable slurry having a viscosity slightly higher than that of water. Each kaolin slurry remained deflocculated for a period of time, depending upon the hydrolytic stability of the acetal carboxylate polymer. When the polymer depolymerized, the pumpable slurry rapidly reflocculated to the thick gel. The time that the kaolin was deflocculated was measured and compared to the Hammet-Sigma function of $R^4$ of the end group on the acetal carboxylate polymer. The results are presented in Table 3. In each case $R^5$ is H.

TABLE 3
KAOLIN DEFLOCCULATION TIME AS A FUNCTION OF END GROUP STRUCTURE AT pH 6

| POLYMER END GROUP | $R^4$ | $R^3$ | $\sigma_p$ ($R^4$) | KAOLIN DEFLOCCULATION TIME |
|---|---|---|---|---|
| H $-$C$-$OC$_2$H$_5$ $\|$ CH$_3$ | $-$CH$_3$ | $-$C$_2$H$_5$ | $-$0.13 | 2 minutes |
| $-$CH$_2$$-$OCH$_3$ | H | $-$CH$_3$ | 0 | 4 days |
| $-$CH$-$OCH$_3$ $\|$ COONa | $-$COONa | $-$CH$_3$ | $+$0.13 | 23 days |

It can be seen that the hydrolytic stability increased dramatically as $\sigma_p$ of $R^4$ became more positive.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. In a method of controlling the hydrolytic stability of an acetal carboxylate polymer having the general formula:

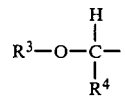

wherein n averages at least 4; M is selected from the group consisting of alkyl groups having 1 to about 4 carbon atoms, alkali metals, ammonium and alkanol amine groups having 1 to about 4 carbon atoms; $R^1$ and $R^2$ are individually any chemically stable group which stabilizes the polymer against rapid depolymerization in alkaline solution; prepared by:
 (a) bringing together under polymerization conditions an ester of glyoxylic acid and a polymerization initiator; and
 (b) adding to the termini of the resulting polymer a chemically stable end group to stabilize the polymer against rapid depolymerization in alkaline solution;
the improvement which comprises controlling the hydrolytic stability by the selection of end groups having substituents on the acetal carbon atom nearest the corresponding terminus of the stabilized polymer, the substituents being more electron withdrawing as hydrolytic stability increases.

2. In a method of claim 1 wherein one such substituent in each end group is H.

3. In a method of claim 2 wherein the substituents have a Hammet-Sigma value between about $-$0.15 and 0.15.

4. In a method of claim 1, 2 or 3 wherein M is an alkali metal.

5. In a method of claim 1, 2 or 3 wherein M is an alkali metal and $R^1$ and $R^2$ are individually represented by the formula:

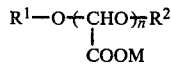

wherein $R^3$ is an alkyl having 1 to about 4 carbon atoms, and $R^4$ is selected from the group consisting of methyl, hydrogen and $-$COOM.

6. In a method of controlling the hydrolytic stability of an acetal carboxylate polymer having the general formula:

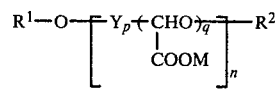

where Y is one or more moieties randomly distributed along the polymer chain derived from compounds selected from the group consisting of epoxy compounds and aldehydes having up to about 20 carbon atoms; p has an average value of 1; the product of q and n averages at least 4; M is selected from the group consisting of alkyl groups having 1 to about 4 carbon atoms, alkali metals, ammonium and alkanol amine groups having from 1 to about 4 carbon atoms; $R^1$ and $R^2$ are individually any chemically stable group which stabilizes the polymer against rapid depolymerization in alkaline solution; prepared by:
 (a) bringing together under polymerization conditions an ester of glyoxylic acid, one or more comonomers, and a polymerization initiator; and
 (b) adding to the termini of the resulting polymer a chemically stable end group to stabilize the polymer against rapid depolymerization in alkaline solution;
the improvement which comprises controlling the hydrolytic stability by selection of end groups having substituents on the acetal carbon atom nearest the corresponding terminus of the stabilized polymer, the substituents being more electron withdrawing as hydrolytic stability increases.

7. In a method of claim 6 wherein one substituent in each end group is H.

8. In a method of claim 7 wherein the substituents have a Hammet-Sigma value between about $-$0.15 and 0.15.

9. In a method of claim 8 wherein q averages at least 4 and the product of n and q averages between about 10 and about 200.

10. In a method of claim 8 wherein q averages at least 8 and the product of n and q averages between about 50 and about 100.

11. In a method of claim 6, 7 or 8 wherein M is an alkali metal.

* * * * *